UNITED STATES PATENT OFFICE.

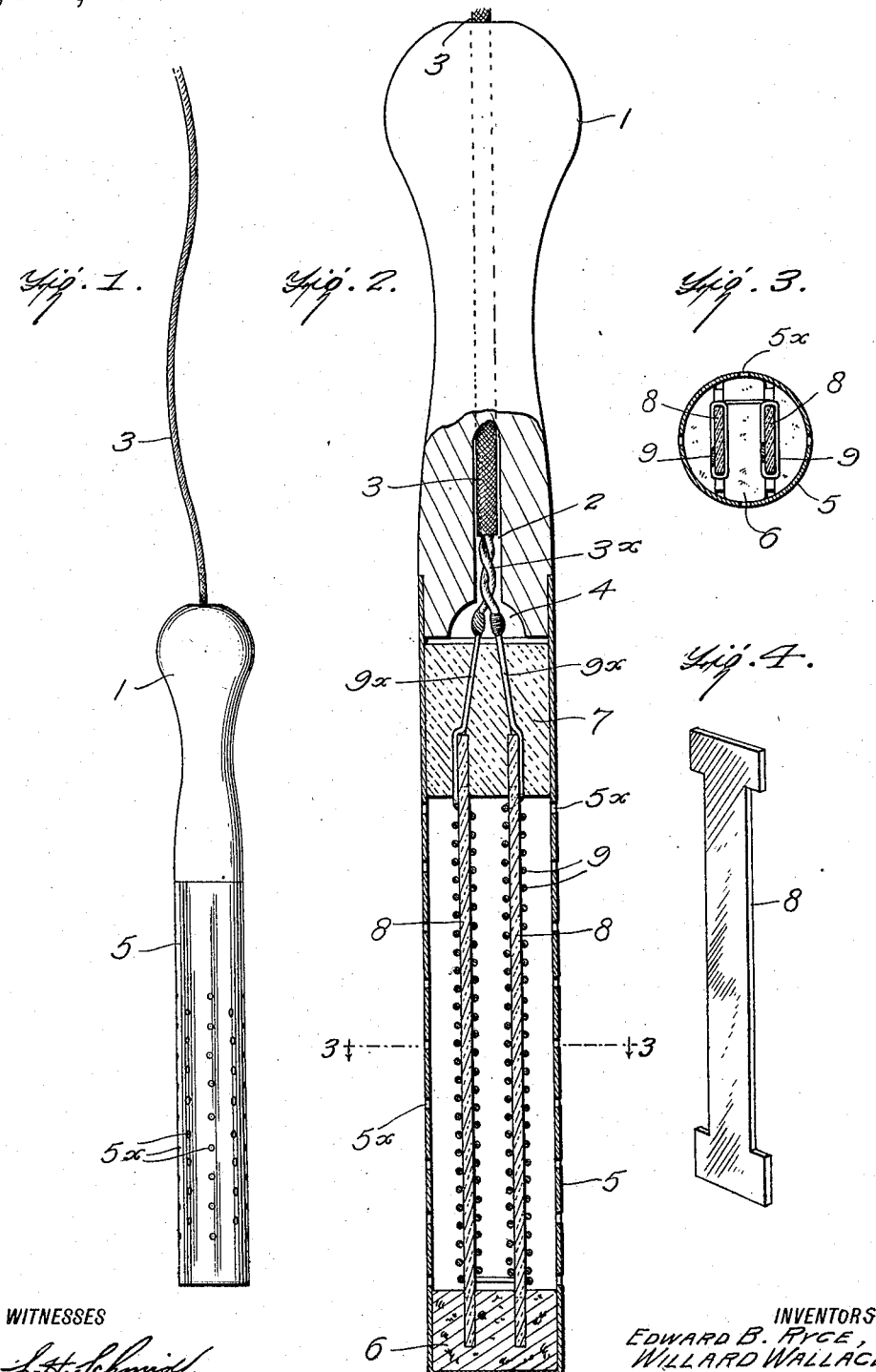

EDWARD BAXTER RYCE AND WILLARD WALLACE, OF LOUISIANA, MISSOURI.

ELECTRIC HEATER.

1,151,403.          Specification of Letters Patent.     Patented Aug. 24, 1915.

Application filed December 12, 1914. Serial No. 876,883.

*To all whom it may concern:*

Be it known that we, EDWARD BAXTER RYCE and WILLARD WALLACE, citizens of the United States, and residents of Louisiana, in the county of Pike and State of Missouri, have made certain new and useful Improvements in Electric Heaters, of which the following is a specification.

Our invention relates to improvements in electric heaters, and it consists in the combinations, constructions and arrangements herein described and claimed.

An object of our invention is to provide a device by means of which water or other liquids can be heated in a minimum amount of time with a minimum amount of electrical energy.

A further object of our invention is to provide a device of the type described having comparatively few parts and being of simple construction, thereby obviating the danger of getting out of order which is apt to be the case with heaters of a more complicated nature.

Other objects and advantages will appear in the following specification and the novel features of the device will be particularly pointed out in the appended claim.

Our invention is illustrated in the accompanying drawings forming part of this application in which—

Figure 1 is a side view of the device, Fig. 2 is an enlarged central section therethrough, Fig. 3 is a section along the line 3—3 of Fig. 2, and Fig. 4 is a perspective view of one of the insulating supports.

In carrying out our invention we provide a handle 1 of the shape shown in the drawings, this handle being preferably of wood and being provided with a central bore 2 through which the cable 3 extends. The handle is recessed at 4 to provide room for attaching the electric terminals.

Arranged to fit on the end of the handle is a tubular casing 5 whch is closed at one end, the other end being arranged to receive a portion of the handle which is recessed so that the casing 5 may be flush with the outer portion of the handle.

Disposed within the casing 5 at the closed end thereof is an insulating retaining member 6 which is preferably made of cork, while at the end near the handle is a retaining member 7 made preferably of porcelain. These are slotted to receive the ends of insulating plates 8 of the shape shown in Fig. 4. These plates are preferably made of mica and are arranged in parallel relation, as shown in Fig. 2.

The resistance element is in the form of a wire 9 whose terminals $9^x$ extend through the insulator 7 and are connected at their ends with the strands $3^x$ of the cable 3 in the recess 4 of the handle. The wire 9 is wound about the plates 8, as clearly shown in the drawings.

From the foregoing description of the various parts of the device the operation thereof may be readily understood.

The outer casing 5 is perforated, as shown at $5^x$, so as to permit the entrance of liquid such as water to the resistance element 9, which is preferably bare wire. In using the device the heater is thrust into the liquid and the current is turned on, whereupon the heat from the resistance element will speedily heat the liquid. This form of heater is especially useful where it is desirable to heat small quantities of liquid, as for instance a cup of tea or cup of water, since only the heat necessary to heat the water itself need be used.

The device may be used as a heater for general purposes, not only for liquids. The device is very light and can be easily transported.

The device is primarily designed for use with a 110 volt alternating current circuit, but it is obvious that it may be used on circuits of other voltages without departing in the least from the spirit and the scope of the invention.

We claim:—

In an electric heater, a handle of insulating material, a metallic casing having an open end arranged to receive one end of said insulating handle, one end of the casing being closed and said casing being perforated, an insulating support carried by the casing at its closed end, said insulating support being provided with a pair of slots, a second insulating support disposed within the casing adjacent to the handle and being provided with a pair of slots registering with the slots in said first mentioned insulating support, parallel insulating plates having portions arranged to enter the slots in the opposed insulating supports, and a heating element consisting of a coil of wire on each of said parallel plates said coils being joined at one end and the opposite terminals of the coils extending through one of said insulating supports, a cable, said handle being provided with a longitudinal bore for the cable, and said terminals being joined to the strands of the cable.

EDWARD BAXTER RYCE.
WILLARD WALLACE.

Witnesses:
E. B. RULE,
WM. B. HALEY.

Copies of this patent may be obtained for five cents each, by addressing the "Commissioner of Patents, Washington, D. C."